(12) United States Patent
de Heer et al.

(10) Patent No.: US 7,066,806 B2
(45) Date of Patent: Jun. 27, 2006

(54) APPARATUS FOR BREAKING TISSUE CONNECTIONS IN POULTRY SUSPENDED BY THE FEET

(75) Inventors: Cornelis de Heer, Oostzaan (NL); Tom Cornelis Jansen, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 10/877,953

(22) Filed: Jun. 25, 2004

(65) Prior Publication Data

US 2005/0037704 A1 Feb. 17, 2005

(30) Foreign Application Priority Data

Jul. 4, 2003 (NL) .................................... 1023819

(51) Int. Cl.
*A22C 21/00* (2006.01)
(52) U.S. Cl. ..................................................... 452/150
(58) Field of Classification Search ................ 452/106, 452/110–114, 117, 120, 123
See application file for complete search history.

(56) References Cited

U.S. PATENT DOCUMENTS

| | | | | |
|---|---|---|---|---|
| 3,879,803 A | * | 4/1975 | Verbakel | ...................... 452/117 |
| 4,019,222 A | | 4/1977 | Scheier et al. | |
| 4,262,387 A | * | 4/1981 | Scheier et al. | ............... 452/117 |
| 4,283,813 A | * | 8/1981 | House | .......................... 452/106 |
| 5,279,517 A | * | 1/1994 | Koops | .......................... 452/118 |
| 5,707,280 A | * | 1/1998 | Tieleman et al. | ............ 452/117 |
| 5,913,720 A | * | 6/1999 | Scott et al. | .................. 452/120 |
| 6,033,296 A | * | 3/2000 | Herman Winkelmolen | .. 452/63 |
| 6,312,326 B1 | * | 11/2001 | van den Nieuwelaar et al. | 452/120 |
| 6,811,478 B1 | * | 11/2004 | van den Nieuwelaar et al. | 452/117 |

FOREIGN PATENT DOCUMENTS

| | | |
|---|---|---|
| EP | 1018890 | 7/2000 |
| EP | 1222858 A2 | 7/2002 |

OTHER PUBLICATIONS

EPO Search Report, Jul. 4, 2003.

* cited by examiner

*Primary Examiner*—Thomas Price
(74) *Attorney, Agent, or Firm*—Dority & Manning

(57) ABSTRACT

The invention relates to an apparatus for breaking tissue connections in poultry suspended by the feet prior to the evisceration of this poultry. The tissue connections connect a portion of the viscera with belly fat located at the breast side of the inner cavity wall of the poultry. The apparatus includes an instrument to be inserted into the poultry via an incision provided at the vent side and performs a movement inside the poultry to break the tissue connections, wherein the instrument breaks the tissue connections between the belly fat and the gizzard.

11 Claims, 3 Drawing Sheets

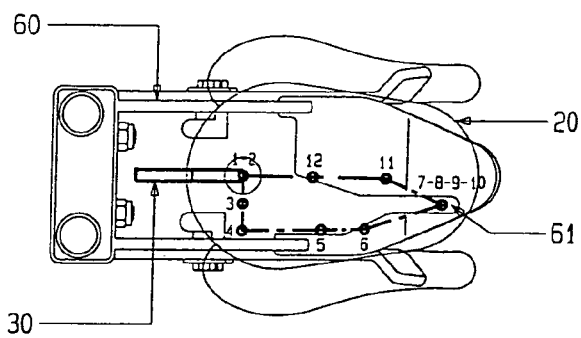
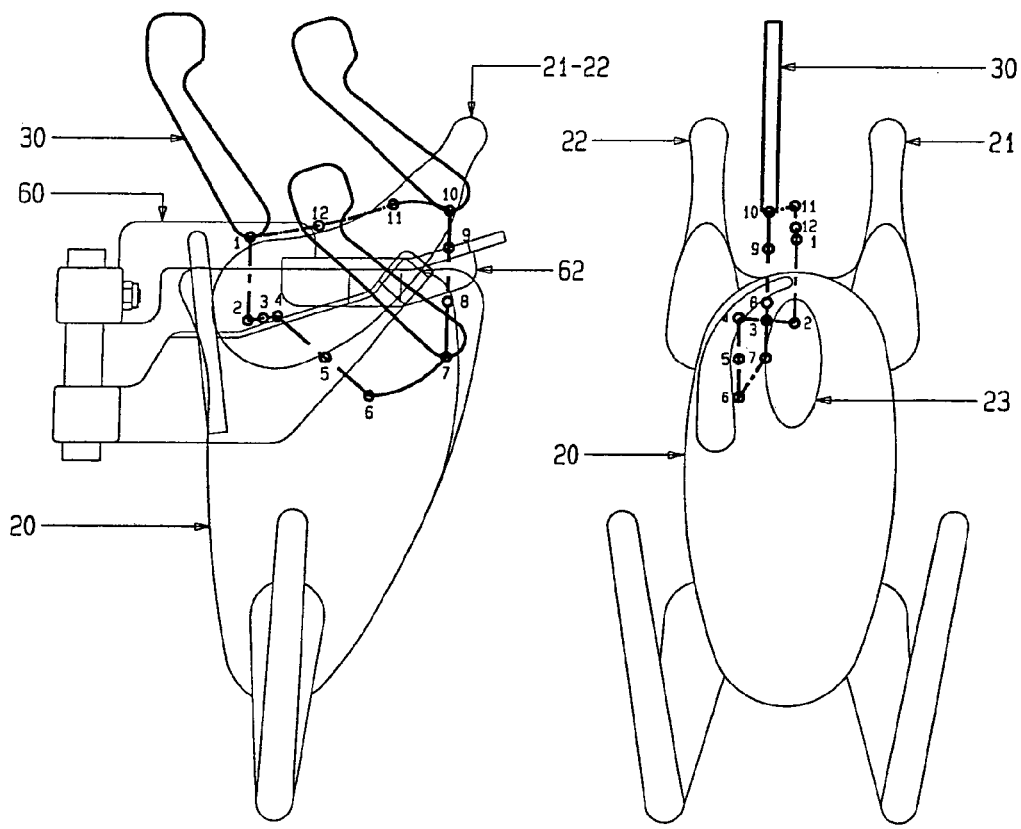

APPARATUS FOR BREAKING TISSUE CONNECTIONS IN POULTRY SUSPENDED BY THE FEET

FIELD OF THE INVENTION

The invention relates to an apparatus for breaking tissue connections in poultry suspended by the feet, prior to the evisceration of this poultry. The viscera comprises the gullet, gizzard and the glandular stomach and the tissue connections connect a portion of the viscera with belly fat located at the breast side of the inner cavity wall of the poultry. An instrument is inserted into the poultry via an incision provided at the vent side for performing a movement inside the poultry to break the tissue connections.

BACKGROUND OF THE INVENTION

An apparatus is known from EP-A-1 018 890, wherein a supporting element is used that is inserted into the poultry via a hole previously provided in the poultry and performs a rotating movement inside the poultry so as to loosen the belly fat from the glandular stomach of the poultry. In this way, the subsequent removal of the viscera encounters less resistance during evisceration, and the removal can be performed more easily. A further advantage is that due to the belly fat being left, the poultry may be heavier so that the poultry brings a higher profit.

SUMMARY OF THE INVENTION

Objects and advantages of the invention will be set forth in part in the following description, or may be obvious from the description, or may be learned through practice of the invention.

According to the invention, an apparatus is proposed that, in accordance with the prior art, is provided with an instrument for breaking tissue connections between the belly fat and the viscera. According to the present invention, the instrument breaks the tissue connections between the belly fat and the gizzard.

The invention is based on the insight that the belly fat in the lower abdominal cavity of the poultry and unattached to the belly skin but attached to the sides in the groin, is grown together with the stomach fat attached to the gizzard. As the instrument according to the invention performs a movement focused on breaking this fusion growth, the amount of belly fat remaining in the poultry can be increased.

For an effectively performed movement for realizing the above mentioned objective of the invention, it is desirable for the instrument to be a spoon without any sharp edges.

In a further aspect of the invention, the apparatus is characterized in that the instrument—viewed from the breast side of the poultry—performs a movement oriented to the left of an imaginary body axis of the poultry. This measure is based on the knowledge that the poultry has an asymmetric build, which is in particular owing to the fact that it is the left half of the belly fat that is grown together with the stomach fat, so that it is precisely this connection which ensures that during evisceration belly fat is removed from the poultry together with the viscera.

To improve the efficiency of the apparatus according to the invention, the instrument, after insertion into the poultry to a first predetermined position, is moved substantially sideways to a second position near a side of the abdominal cavity of the poultry, from where the instrument is moved further into the poultry downward and forward to a third, deepest position. From the third position, the instrument leaves the poultry in a substantially upward movement, scraping along the gizzard. Desirably then, during the upward movement, the instrument breaks the tissue connections between the gizzard and the belly fat, so as to leave the gizzard and belly fat in the abdominal cavity of the poultry.

The apparatus is preferably further provided with a centering brace designed to work together with the instrument, wherein the centering brace during the upward movement of the instrument offers resistance to the removal of gizzard and belly fat from the poultry. This assists the efficacy of the apparatus according to the invention.

Conveniently, the centering brace is provided with a slot through which the instrument leaves the poultry in the upward movement.

In a further aspect of the apparatus according to the invention, the same is characterized in that at its lower side, the centering brace is provided with a plate arranged next to the slot. This provides a flat surface along which the instrument can be moved upward, while the plate pushes the belly skin downward.

Hereinbelow the invention will be further elucidated by way of a non-limiting exemplary embodiment and with reference to the drawing.

BRIEF DESCRIPTION OF THE DRAWINGS

In the drawing, FIGS. 1, 2 and 3 schematically show a side elevation, front elevation and top view, respectively, of a carcass of poultry, such as a chicken, suspended by the legs, schematically illustrating some elements of the apparatus in the course of a processing track.

Similar parts in the figures carry the same reference numerals.

DETAILED DESCRIPTION

Figure 4:
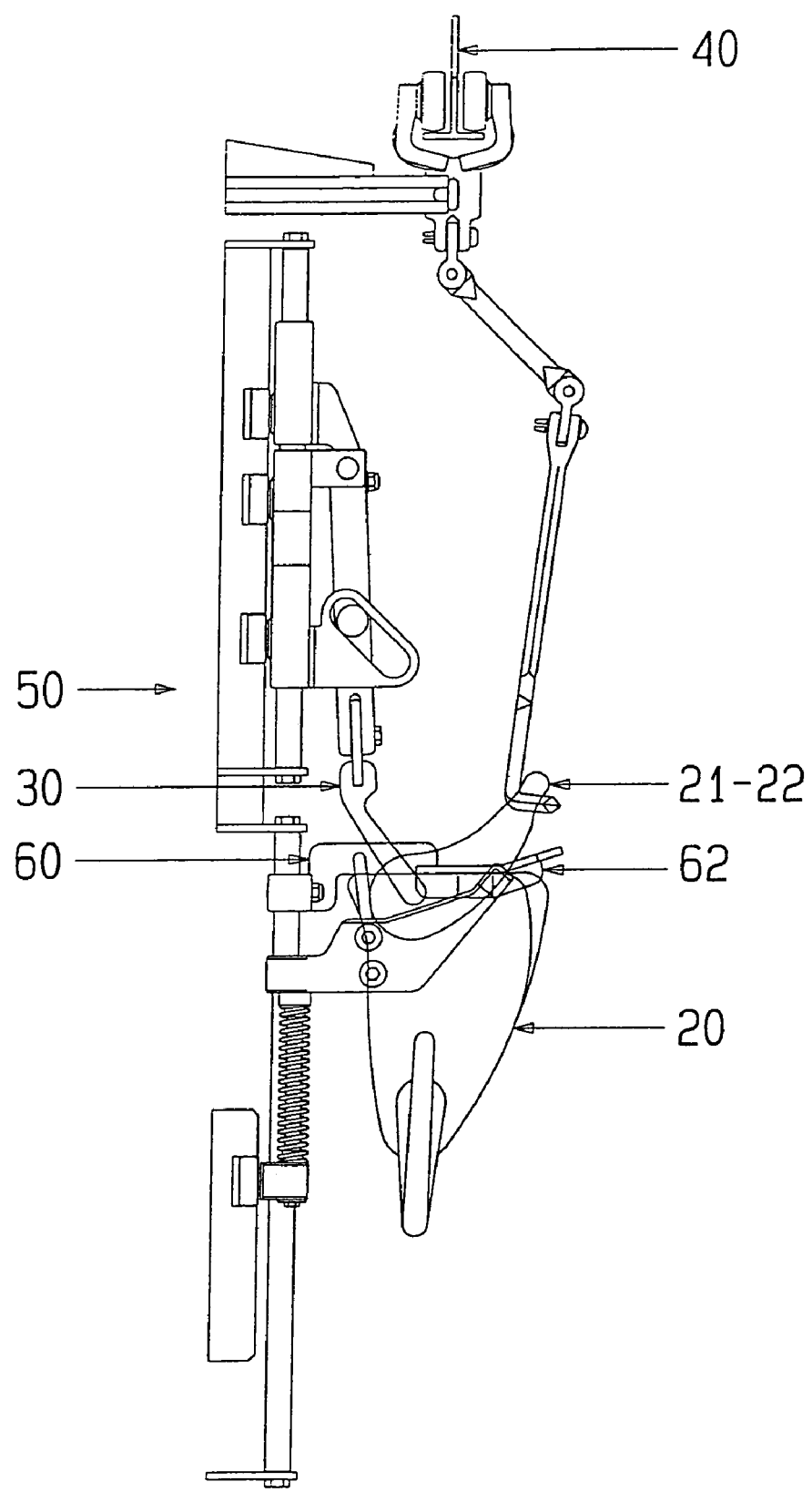
FIG. 4 is a cross-sectional view of the apparatus according to the invention.

Reference will now be made in detail to embodiments of the invention, one or more examples of which are illustrated in the drawings. The embodiments are provided by way of explanation of the invention, and are not meant as a limitation of the invention. It is intended that the invention include modifications and variations to the embodiments illustrated or described herein.

In a manner well known to the person skilled in the art and therefore shown only in outline, FIG. 4 shows the poultry 20 being conducted via an overhead conveyor 40 along a number of processing stations.

One of the processing stations provided in the path of the overhead conveyor is the present apparatus 50 according to the invention for breaking tissue connections in the poultry 20 suspended by the legs.

The person skilled in the art is quite familiar with the fact that the poultry possesses viscera comprising gullet, gizzard and glandular stomach. The person skilled in the art also knows that the viscera are at least partly connected with belly fat located at the breast side of the inner cavity wall of the poultry 20. There is no need therefore to elucidate or illustrate this in the figures.

The apparatus 50 according to the invention is embodied with solidly supported instrument 30 resting, following a path inside the poultry 20, symbolized by a number of positions 1 to 12 indicated in the FIGS. 1–3 with reference numerals. In the FIGS. 1–3 these positions are connected with each other by dotted lines.

The above mentioned instrument 30 is preferably a spoon without any sharp edges, and can be inserted from the top side into the poultry suspended by the legs for performing the movement in accordance with the invention to break the targeted tissue connections in the poultry 20.

As FIGS. 2 and 3 clearly show, the movement performed in the poultry 20 is, viewed from the breast side of the poultry, a left (from an imaginary body axis of the poultry 20) oriented movement.

From a starting position 1, the instrument is inserted into the poultry (see FIGS. 1 and 2) to a first predetermined position 2. The instrument 30 then moves substantially sideways as clearly showed in the FIGS. 2 and 3 to a second position 4 near a side of the abdominal cavity of the poultry. From this second position 4, the instrument 30 moves further into the poultry 20 downward and forward (see in particular FIGS. 1 and 2) until the instrument 30 has reached a third, deepest position 6. It is from this deepest position 6 that the instrument 30 leaves the poultry 20 in a substantially upward movement while scraping along the gizzard 23 of the poultry.

Figure 5B:
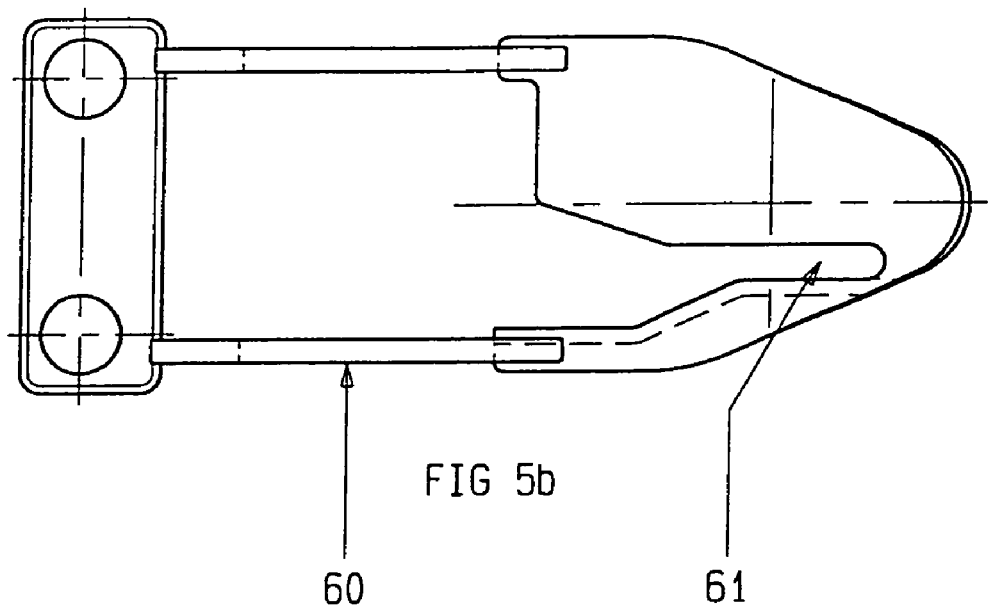
FIGS. 5a and 5b show a side and top view of the centering brace of the apparatus according to the invention.

During this upward movement, the instrument 30 breaks the tissue connections between the gizzard 23 and the belly fat, leaving both the gizzard and the belly fat in the abdominal cavity of the poultry 20. The instrument 30 cooperates effectively with a centering brace 60, which is preferably included in the apparatus. The centering brace 60 is shown in its operative configuration in the FIGS. 1 and 3, and separately in the FIGS. 5a and 5b in side and top view, respectively. During the upward movement of the instrument 30, this centring brace 60 resists the removal of gizzard and belly fat from the poultry 20. To this end, the centring brace 60 possesses a slot 61 clearly shown in FIG. 5b, through which the instrument 30 leaves the poultry 20 in the upward movement. This upward movement corresponds with the series of positions shown in FIG. 3 and carrying the reference numerals 7 to 10.

Figure 5A:
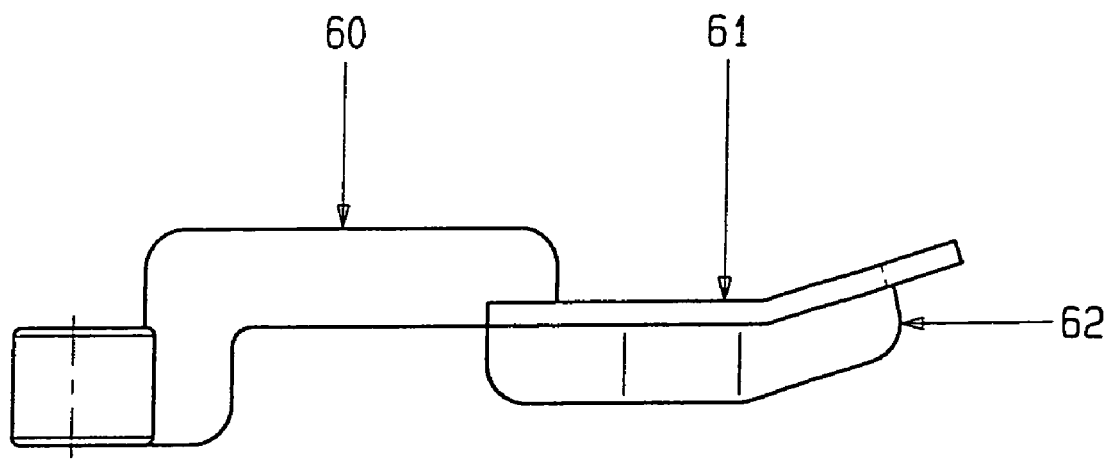

FIG. 1 and FIG. 5a further show that at its lower side, the centering brace 60 possesses a plate 62 arranged next to the slot 61, forming a flat surface along which the instrument 30 can be moved upward. In doing so, the plate 62 pushes the belly skin downward.

It should be apparent to those skilled in the art that modifications and variations can be made to the embodiments described or shown herein without departing from the scope and spirit of the appended claims.

The invention claimed is:

1. An apparatus for breaking tissue connections in poultry suspended by the feet along a conveyor line prior to evisceration of the poultry, the tissue connections connecting a portion of the viscera with belly fat located at the breast side of a wall of the body cavity of the suspended poultry, said apparatus configured at a processing station disposed in the conveying path of said conveyor line, said apparatus comprising an insertion instrument insertable into the body cavity through an incision at the vent side of the poultry, said instrument having a forward end configured to access and break the tissue connections between the belly fat and gizzard as said instrument is moved through a defined sequence of predetermined positions within the body cavity.

2. The apparatus as in claim 1, wherein said instrument is configured as a spoon without sharp edges.

3. The apparatus as in claim 1, wherein upon insertion into the body cavity to a first predetermined position, said instrument is sequentially movable to a second position that is a left position with respect to a body axis of the poultry viewed from the breast side of the poultry.

4. The apparatus as in claim 3, wherein said instrument is sequentially movable from said second position further into and downward in the body cavity to a third deepest position, said instrument subsequently movable from said third position substantially upward scraping along the gizzard to break the tissue connections between the gizzard and the belly fat.

5. The apparatus as in claim 4, further comprising a centering brace configured with said insertion instrument so as to apply resistance to removal of the gizzard upon said upward movement of said insertion instrument.

6. The apparatus as in claim 5, wherein said centering brace comprises a slot through which said insertion instrument passes and leaves the poultry in said upward movement of said insertion instrument.

7. The apparatus as in claim 6, wherein said centering brace comprises a plate disposed adjacent to said slot to push the belly skin of the poultry down upon said upward movement of said insertion instrument.

8. A method for breaking tissue connections in poultry suspended by the feet along a conveyor line prior to evisceration of the poultry, said method carried out by a sequentially operated apparatus configured at a processing station disposed in the path of the conveyor line to perform said method in a plurality of sequential movements, the tissue connections connecting a portion of the viscera with belly fat located at the breast side of a wall of the body cavity of the suspended poultry, said method comprising inserting an insertion instrument into the body cavity of the poultry through an incision at the vent side of the poultry, and moving the insertion instrument through a defined sequence of predetermined positions within the body cavity to break the tissue connections between the belly fat and gizzard and leaving the belly fat and gizzard in the body cavity.

9. The method as in claim 8, wherein the insertion instrument is inserted into the body cavity to a first predetermined position, and then moved to a second position that is a left position with respect to a body axis of the poultry viewed from the breast side of the poultry.

10. The method as in claim 9, further comprising moving the insertion instrument from the second position further into and downward in the body cavity to a third deepest position, and subsequently moving the insertion instrument from the third position substantially upward scraping along the gizzard to break the tissue connections between the gizzard and the belly fat.

11. The method as in claim 10, further comprising applying a resistive force to removal of the gizzard with an element configured with the insertion instrument upon the upward movement of the insertion instrument.

* * * * *